United States Patent
Jang et al.

(10) Patent No.: US 12,537,227 B2
(45) Date of Patent: Jan. 27, 2026

(54) LIQUID ELECTROLYTE FOR LITHIUM-SULFUR SECONDARY BATTERY AND LITHIUM-SULFUR SECONDARY BATTERY COMPRISING SAME

(71) Applicant: LG ENERGY SOLUTION, LTD., Seoul (KR)

(72) Inventors: Eunji Jang, Daejeon (KR); Kwonnam Sohn, Daejeon (KR); Changhun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 583 days.

(21) Appl. No.: 17/928,903

(22) PCT Filed: Oct. 27, 2021

(86) PCT No.: PCT/KR2021/015199
§ 371 (c)(1),
(2) Date: Nov. 30, 2022

(87) PCT Pub. No.: WO2022/092800
PCT Pub. Date: May 5, 2022

(65) Prior Publication Data
US 2023/0231192 A1    Jul. 20, 2023

(30) Foreign Application Priority Data

Oct. 30, 2020 (KR) .................. 10-2020-0143315
Oct. 30, 2020 (KR) .................. 10-2020-0143326
Oct. 26, 2021 (KR) .................. 10-2021-0143351

(51) Int. Cl.
*H01M 10/0567* (2010.01)
*H01M 10/052* (2010.01)
*H01M 10/0569* (2010.01)

(52) U.S. Cl.
CPC ..... *H01M 10/0567* (2013.01); *H01M 10/052* (2013.01); *H01M 10/0569* (2013.01); *H01M 2300/004* (2013.01)

(58) Field of Classification Search
CPC .......... H01M 10/0567; H01M 10/052; H01M 10/0569; H01M 2300/004; H01M 4/38; H01M 4/382; H01M 2300/0034; H01M 2300/0037; H01M 10/0568; Y02E 60/10
See application file for complete search history.

(56) References Cited

U.S. PATENT DOCUMENTS

| | | |
|---|---|---|
| 2005/0175904 A1 | 8/2005 | Gorkovenko |
| 2012/0135298 A1* | 5/2012 | Yamada ............ H01M 10/0565 429/163 |
| 2015/0340696 A1* | 11/2015 | Son ........................ H01M 4/58 429/188 |
| 2018/0301739 A1* | 10/2018 | Park .................... H01M 10/052 |
| 2019/0097270 A1 | 3/2019 | Park et al. |
| 2019/0140322 A1* | 5/2019 | Ren ....................... H01M 4/134 |
| 2019/0148775 A1 | 5/2019 | Zhang et al. |
| 2019/0326642 A1 | 10/2019 | Chesneau et al. |
| 2020/0161706 A1* | 5/2020 | Cao .................. H01M 10/0568 |
| 2020/0274148 A1* | 8/2020 | Xiao .................... H01M 4/366 |
| 2021/0226254 A1* | 7/2021 | Kim ................. H01M 10/0568 |

FOREIGN PATENT DOCUMENTS

| | | |
|---|---|---|
| EP | 3706231 A1 | 9/2020 |
| JP | 2012-119151 A | 6/2012 |
| JP | 2020-504434 A | 2/2020 |
| JP | 2021-508148 A | 2/2021 |
| KR | 10-2007-0027512 A | 3/2007 |
| KR | 10-2018-0001997 A | 1/2018 |
| KR | 10-2018-0115591 A | 10/2018 |
| KR | 10-2019-0125740 A | 11/2019 |
| WO | 2020131175 A1 | 6/2020 |
| WO | 2020150154 A1 | 7/2020 |

OTHER PUBLICATIONS

Zheng et al., "Localized high concentration electrolyte behavior near a lithium-metal anode surface", 2019, J. Materials Chemistry A, vol. 7, pp. 25047-25055 (Year: 2019).*
Yu Zheng et al., (2019), "Localized High Concentration Electrolyte Behavior Near a Lithium-Metal Anode Surface", J. Mater. Chem. A, vol. 7, pp. 25047-25055.

* cited by examiner

*Primary Examiner* — Dah-Wei D. Yuan
*Assistant Examiner* — Pin Jan Wang
(74) *Attorney, Agent, or Firm* — Bryan Cave Leighton Paisner LLP

(57) ABSTRACT

The present disclosure relates to an electrolyte solution for a lithium-sulfur secondary battery and a lithium-sulfur secondary battery comprising the same, more particularly to an electrolyte solution for a lithium-sulfur secondary battery containing a lithium salt and a non-aqueous solvent, wherein the non-aqueous solvent comprises an ether-based solvent and a nonsolvent, the ether-based solvent comprises a linear ether and a cyclic ether, and the nonsolvent comprises a compound having a specific structure.

14 Claims, No Drawings

LIQUID ELECTROLYTE FOR LITHIUM-SULFUR SECONDARY BATTERY AND LITHIUM-SULFUR SECONDARY BATTERY COMPRISING SAME

CROSS-REFERENCE TO RELATED APPLICATIONS

This application is a National Phase entry pursuant to 35 U.S.C. § of International Application No. PCT/KR2021/015199, filed on Oct. 27, 2021, and claims the benefit of and priority to Korean Patent Application No. 10-2020-0143315, filed on Oct. 30, 2020, Korean Patent Application No. 10-2020-0143326, filed on Oct. 30, 2020 and Korean Patent Application No. 10-2021-0143351, filed on Oct. 26, 2021, the disclosures of which are incorporated by reference in their entirety for all purposes as if fully set forth herein.

TECHNICAL FIELD

The present disclosure relates to an electrolyte solution for a lithium-sulfur secondary battery and a lithium-sulfur secondary battery containing the same.

BACKGROUND

As the application area of secondary battery are expanding to the electric vehicles (EV) and the energy storage devices (ESS), the lithium-ion secondary battery with relatively low weight-to-energy storage density (~250 Wh/kg) are facing limitations in application to such products. Alternatively, since the lithium-sulfur secondary battery can achieve the theoretically high weight-to-energy storage density (~2,600 Wh/kg), it is attracting attention as a next-generation secondary battery technology.

The lithium-sulfur secondary battery means a battery system using a sulfur-based material having a sulfur-sulfur bond (S—S bond) as a positive electrode active material and using lithium metal as a negative electrode active material. Sulfur, which is the main material of the positive electrode active material has advantages that it is very rich in resources, is not toxic, and has a low atomic weight.

In the lithium-sulfur secondary battery, when discharging the battery, lithium which is a negative electrode active material is oxidized while releasing electron and thus ionizing, and the sulfur-based material which is a positive electrode active material is reduced while accepting the electron. In that case, the oxidation reaction of lithium is a process by which lithium metal releases electron and is converted to lithium cation form. In addition, the reduction reaction of sulfur is a process by which the S—S bond accepts two electrons and is converted to a sulfur anion form. The lithium cation produced by the oxidation reaction of lithium is transferred to the positive electrode through the electrolyte and is combined with the sulfur anion generated by the reduction reaction of sulfur to form a salt. Specifically, sulfur before discharging has a cyclic $S_8$ structure, which is converted to lithium polysulfide ($LiS_x$) by the reduction reaction. When the lithium polysulfide is completely reduced, lithium sulfide ($Li_2S$) is produced.

Sulfur, which is a positive electrode active material, is difficult to secure reactivity with electrons and lithium ions in a solid state due to its low electrical conductivity characteristics. In the existing lithium-sulfur secondary battery, in order to improve the reactivity of sulfur, an intermediate polysulfide in the form of $Li_2S_x$ is generated to induce a liquid phase reaction and improve the reactivity. In this case, an ether-based solvent such as dioxolane and dimethoxy ethane, which are highly soluble for lithium polysulfide, is used as a solvent for the electrolyte solution.

However, when such an ether-based solvent is used, there is a problem in that the lifetime characteristics of the lithium-sulfur secondary battery are deteriorated due to various causes. For example, the lifetime characteristics of the lithium-sulfur secondary battery may be deteriorated by the leaching of lithium polysulfide from the positive electrode, the occurrence of a short due to the growth of dendrites on the lithium negative electrode, and the deposition of by-products due to the decomposition of the electrolyte solution.

In particular, when such an ether-based solvent is used, a large amount of lithium polysulfide can be dissolved and the reactivity is high. However, due to the characteristics of lithium polysulfide soluble in the electrolyte solution, the reactivity and lifetime characteristics of sulfur are affected depending on the content of the electrolyte solution.

Recently, in order to develop a lithium-sulfur secondary battery with a high energy density of 500 Wh/kg or more required for aircraft and next-generation electric vehicles, it is required that the loading of sulfur in the electrode is large and the content of the electrolyte solution is minimized.

However, due to the characteristics of the ether-based solvent, as the content of the electrolyte solution is reduced, the viscosity increases rapidly during charging and discharging, and thus there is a problem that overvoltage may be generated and deterioration may occur.

Therefore, in order to prevent the decomposition of the electrolyte solution and secure excellent lifetime characteristics, research on adding a nonsolvent as a solvent for the electrolyte solution is continuously being conducted. Nevertheless, the components and composition of the electrolyte solution, which can prevent decomposition of the electrolyte solution and improve its lifetime characteristics, have not been clearly elucidated. In particular, it is not known in detail about the components and composition of the electrolyte solution suitable for the case of a pouch cell, etc. with very little electrolyte solution content.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

Accordingly, in the present disclosure, it was confirmed that in the electrolyte solution for the lithium-sulfur secondary battery containing a lithium salt and a non-aqueous solvent, if the non-aqueous solvent comprises an ether-based solvent and a nonsolvent, in order to prevent decomposition of the electrolyte solution for the lithium-sulfur secondary battery and improve its lifetime characteristics, the above problems are solved and thus the performance of the lithium-sulfur secondary battery is improved, and as a result, the present disclosure was completed.

Therefore, it is an object of the present disclosure to provide an electrolyte solution for a lithium-sulfur secondary battery, which can prevent decomposition of the electrolyte solution and improve its lifetime characteristics. In addition, it is another object of the present disclosure to provide a lithium-sulfur secondary battery with improved performance by comprising the electrolyte solution described above.

Technical Solution

In order to achieve the above objects, the present disclosure provides an electrolyte solution for a lithium-sulfur secondary battery containing a lithium salt and a non-aqueous solvent, wherein the non-aqueous solvent comprises an ether-based solvent and a nonsolvent, the ether-based solvent comprises a linear ether and a cyclic ether, and the nonsolvent comprises the compound represented by Chemical Formula 1 below:

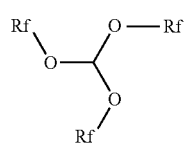

[Chemical Formula 1]

wherein Rfs are the same as or different from each other, and each Rf independently represent an alkyl group having 1 to 3 carbon atoms substituted with fluorine.

In addition, the present disclosure provides the electrolyte solution for the lithium-sulfur secondary battery, wherein the lithium salt is at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, lithium chloroborane, lithium lower aliphatic carboxylate, lithium tetraphenyl borate and lithium imide.

In addition, the present disclosure provides the electrolyte solution for the lithium-sulfur secondary battery, wherein the linear ether is selected from the group consisting of dimethyl ether, diethyl ether, dipropyl ether, dibutyl ether, diisobutyl ether, ethylmethyl ether, ethylpropyl ether, ethyl tertbutyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethyl ether, butylene glycol ether, diethylene glycol ethyl methyl ether, diethylene glycol isopropyl methyl ether, diethylene glycol butyl methyl ether, diethylene glycol tertbutyl ethyl ether, and ethylene glycol ethyl methyl ether.

In addition, the present disclosure provides the electrolyte solution for the lithium-sulfur secondary battery, wherein the cyclic ether is selected from the group consisting of dioxolane, methyldioxolane, dimethyldioxolane, vinyldioxolane, methoxydioxolane, ethylmethyldioxolane, oxane, dioxane, trioxane, tetrahydrofuran, methyltetrahydrofuran, dimethyltetrahydrofuran, dimethoxytetrahydrofuran, ethoxytetrahydrofuran, dihydropyran, tetrahydropyran, furan and 2-methylfuran.

In addition, the present disclosure provides the electrolyte solution for the lithium-sulfur secondary battery, wherein the fluorinated alkyl group of Chemical Formula 1 is a fluorinated C1 to C3 alkyl group substituted with 1 to 7 fluorines.

In addition, the present disclosure provides the electrolyte solution for the lithium-sulfur secondary battery, wherein the fluorinated C1 to C3 alkyl group of Chemical Formula 1 is a fluorinated C1 to C2 alkyl group substituted with 1 to 5 fluorines.

In addition, the present disclosure provides the electrolyte solution for the lithium-sulfur secondary battery, wherein the fluorinated alkyl group of Chemical Formula 1 contains a difluoromethyl group or a trifluoromethyl group at the terminal thereof.

In addition, the present disclosure provides the electrolyte solution for the lithium-sulfur secondary battery, wherein the content of the nonsolvent is 5 vol. % to 20 vol. % relative to the total volume of the non-aqueous solvent.

In addition, the present disclosure provides the electrolyte solution for the lithium-sulfur secondary battery, wherein the content of the linear ether is 50 vol. % to 90 vol. % relative to the total volume of the non-aqueous solvent, and the content of the cyclic ether is 10 vol. % to 30 vol. % relative to the total volume of the non-aqueous solvent.

In addition, the present disclosure provides the electrolyte solution for the lithium-sulfur secondary battery, wherein the volume ratio of the ether-based solvent to the nonsolvent is 95:5 to 80:20.

In addition, the present disclosure provides the electrolyte solution for the lithium-sulfur secondary battery, wherein the volume ratio of the linear ether to the cyclic ether is 9:1 to 5:5.

In addition, the present disclosure provides the electrolyte solution for the lithium-sulfur secondary battery, wherein the linear ether is dimethoxyethane.

In addition, the present disclosure provides the electrolyte solution for the lithium-sulfur secondary battery, wherein the cyclic ether is 2-methylfuran.

In addition, the present disclosure provides the electrolyte solution for the lithium-sulfur secondary battery, wherein the compound represented by Chemical Formula 1 is tris(2,2-difluoroethyl)orthoformate or tris(2,2,2-trifluoroethyl)orthoformate.

In addition, the present disclosure provides a lithium-sulfur secondary battery comprising the electrolyte solution described above, a positive electrode, a negative electrode and a separator.

Advantageous Effects

The electrolyte solution for the lithium-sulfur secondary battery according to the present disclosure comprises a lithium salt and a non-aqueous solvent, the non-aqueous solvent comprises an ether-based solvent and a nonsolvent, the ether-based solvent comprises a linear ether and a cyclic ether, and the nonsolvent comprises a compound having a specific structure, and thus during the operation of the lithium-sulfur secondary battery, there is an effect of preventing the decomposition of the electrolyte solution and improving the lifetime characteristics.

DETAILED DESCRIPTION

The embodiments provided according to the present disclosure can all be achieved by the following description. It should be understood that the following description describes preferred embodiments of the present disclosure, and it should be understood that the present disclosure is not necessarily limited thereto.

The present disclosure provides an electrolyte solution for a lithium-sulfur secondary battery comprising a lithium salt and a non-aqueous solvent, wherein the non-aqueous solvent comprises an ether-based solvent and a nonsolvent, the ether-based solvent comprises a linear ether and a cyclic ether, and the nonsolvent comprises a compound represented by Chemical Formula 1 below:

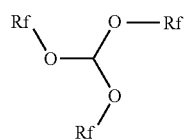

[Chemical Formula 1]

wherein Rfs are the same as or different from each other, and each independently represent a fluorinated C1 to C3 alkyl group.

The electrolyte solution for the lithium-sulfur secondary battery of the present disclosure may include a lithium salt and a non-aqueous solvent, wherein the lithium salt is a good material to dissolve in non-aqueous organic solvents, and may be selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, lithium chloroborane, lithium lower aliphatic carboxylate, lithium tetraphenyl borate and lithium imide, and preferably may be LiN(CF$_3$SO$_2$)$_2$.

The concentration of the lithium salt may be 0.2 to 2 M, preferably 0.5 to 1.8 M, more preferably 0.6 to 1.7 M depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may be increased and thus the mobility of the lithium ion (Li$^+$) may be reduced.

The non-aqueous solvent may comprise an ether-based solvent and a nonsolvent, and the ether-based solvent may comprise a linear ether and a cyclic ether.

The linear ether may be selected from the group consisting of dimethyl ether, diethyl ether, dipropyl ether, dibutyl ether, diisobutyl ether, ethylmethyl ether, ethylpropyl ether, ethyl tertbutyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethyl ether, butylene glycol ether, diethylene glycol ethyl methyl ether, diethylene glycol isopropyl methyl ether, diethylene glycol butyl methyl ether, diethylene glycol tertbutyl ethyl ether, and ethylene glycol ethyl methyl ether, and preferably may be dimethoxyethane.

The cyclic ether may be selected from the group consisting of dioxolane, methyldioxolane, dimethyldioxolane, vinyldioxolane, methoxydioxolane, ethylmethyldioxolane, oxane, dioxane, trioxane, tetrahydrofuran, methyltetrahydrofuran, dimethyltetrahydrofuran, dimethoxytetrahydrofuran, ethoxytetrahydrofuran, dihydropyran, tetrahydropyran, furan and 2-methylfuran, and preferably may be 2-methylfuran.

In addition, the nonsolvent may comprise a compound represented by Chemical Formula 1 below:

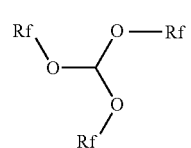

[Chemical Formula 1]

wherein Rfs are the same as or different from each other, and each independently represent a fluorinated C1 to C3 fluorinated alkyl group.

The compound represented by Chemical Formula 1 has a high flash point of 150° C. or more and a low viscosity of 5 cP or less without solvating lithium ions. Specifically, the compound represented by Chemical Formula 1 exhibits an effect of lowering flammability and viscosity. This may prevent the deterioration of the electrolyte solution and improves the mobility of lithium ions to ensure high stability even for long-term operation of the battery.

The fluorinated alkyl group of Chemical Formula 1 may be a fluorinated C1 to C3 alkyl group substituted with 1 to 7 fluorines, preferably a fluorinated C1 to C2 alkyl group substituted with 1 to 5 fluorines, more preferably a fluorinated alkyl group containing a difluoromethyl group or a trifluoromethyl group at the terminal of the above-described fluorinated alkyl group.

In addition, the compound represented by Chemical Formula 1 may be a trialkyl orthoformate-based compound substituted with fluorine, and the three alkyl groups in the trialkyl orthoformate-based compound may each independently be an alkyl group having 1 to 3 carbon atoms, preferably an alkyl group having 1 to 2 carbon atoms. In addition, the alkyl group may be each independently a fluorinated alkyl group substituted with 1 to 7 fluorines, preferably a fluorinated alkyl group substituted with 1 to 5 fluorines, more preferably an alkyl group substituted with a difluoromethyl group or a trifluoromethyl group at its terminal. Specifically, the compound represented by Chemical Formula 1 may be tris(2,2-difluoroethyl)orthoformate or tris(2,2,2-trifluoroethyl)orthoformate.

In addition, the electrolyte solution for the lithium-sulfur secondary battery of the present disclosure contains an ether-based solvent and a nonsolvent as the non-aqueous solvent, thereby exhibiting an effect of preventing the decomposition of the electrolyte solution of the lithium-sulfur secondary battery and improving its lifetime characteristics. In particular, the electrolyte solution comprises a linear ether and a cyclic ether as the ether-based solvent, and a compound represented by Chemical Formula 1 as the nonsolvent, thereby exhibiting an effect of significantly improving the lifetime characteristics of the battery.

In this case, the content of the nonsolvent may be 5 vol. % to 20 vol. %, preferably 5 vol. % to 10 vol. %, relative to the total volume of the non-aqueous solvent. In addition, the volume ratio of the ether-based solvent to the nonsolvent may be 99:1 to 50:50, preferably 95:5 to 70:30, more preferably 95:5 to 80:20.

If the content of the nonsolvent and the volume ratio of the ether-based solvent to the nonsolvent are less than the above ranges, the effect of improving lifetime characteristics is insufficient. If the content of the nonsolvent and the volume ratio of the ether-based solvent to the nonsolvent exceed the above ranges, there may be a problem that it is impossible to discharge at a high current density. Therefore, it is preferable that the content of the nonsolvent and the volume ratio of the ether-based solvent to the nonsolvent satisfy the above range.

In addition, the content of the linear ether may be 50 vol. % to 90 vol. %, preferably 60 vol. % to 80 vol. %, more preferably 60 vol. % to 75 vol. % relative to the total volume of the non-aqueous solvent. In addition, the content of the cyclic ether may be 10 vol. % to 30 vol. %, preferably 15 vol. % to 25 vol. %, relative to the total volume of the non-aqueous solvent.

The volume ratio of the linear ether to the cyclic ether may be 9:1 to 1:9, preferably 8:2 to 2:8, more preferably 7:3 to 3:7.

In addition, the volume ratio of the linear ether to the nonsolvent may be 20:1 to 1:1, preferably 15:1 to 5:1, more preferably 15:1 to 3:1.

In addition, the volume ratio of the cyclic ether to the nonsolvent may be 1:10 to 10:1, preferably 1:5 to 5:1, more preferably 1:4 to 1:1.

If the content of the linear ether, the content of the cyclic ether, the volume ratio of the linear ether to the cyclic ether, the volume ratio of the linear ether to the nonsolvent, and the volume ratio of the cyclic ether to the nonsolvent are out of the above ranges, the effect of improving the lifetime characteristics of the battery may be insufficient, so that the desired effect cannot be obtained. Therefore, it is preferable that the content of the linear ether, the content of the cyclic ether, the volume ratio of the linear ether to the cyclic ether, the volume ratio of the linear ether to the nonsolvent, and the volume ratio of the cyclic ether to the nonsolvent satisfy the above ranges.

The electrolyte solution for the lithium-sulfur secondary battery of the present disclosure may further comprise nitric acid or nitrous acid-based compounds as an additive. The nitric acid or nitrous acid-based compounds have an effect of forming a stable film on the lithium electrode and improving the charging/discharging efficiency. The nitric acid or nitrous acid-based compounds may be, but are not limited to, at least one selected from the group consisting of inorganic nitric acid or nitrous acid compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$), and ammonium nitrite ($NH_4NO_2$); organic nitric acid or nitrous acid compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite, and octyl nitrite; organic nitro compounds such as nitromethane, nitropropane, nitrobutane, nitrobenzene, dinitrobenzene, nitropyridine, dinitropyridine, nitrotoluene, and dinitrotoluene, and the combinations thereof. Preferably, lithium nitrate ($LiNO_3$) is used.

In addition, the electrolyte solution may further comprise other additives for the purpose of improving charging/discharging characteristics, flame retardancy, and the like. Examples of the additives may comprise pyridine, triethylphosphite, triethanolamine, cyclic ether, ethylene diamine, n-glyme, hexaphosphoric triamide, nitrobenzene derivatives, sulfur, quinoneimine dyes, N-substituted oxazolidinone, N, N-substituted imidazolidine, ethylene glycol dialkyl ether, ammonium salt, pyrrole, 2-methoxy ethanol, aluminum trichloride, fluoroethylene carbonate (FEC), propene sultone (PRS), vinylene carbonate (VC) and the like.

The method for preparing the electrolyte solution for the lithium-sulfur secondary battery of the present disclosure is not particularly limited in the present disclosure, and the electrolyte solution may be prepared by a conventional method known in the art.

In addition, the present disclosure provides a lithium-sulfur secondary battery comprising an electrolyte solution for a lithium-sulfur secondary battery.

The lithium-sulfur secondary battery may comprise a positive electrode, a negative electrode, a separator interposed between the positive electrode and the negative electrode, and an electrolyte solution, wherein the electrolyte solution may comprise the electrolyte solution for the lithium-sulfur secondary battery according to the present disclosure.

The positive electrode may comprise a positive electrode current collector and a positive electrode active material coated on one or both sides of the positive electrode current collector.

The positive electrode current collector supports the positive electrode active material and is not particularly limited as long as it has high conductivity without causing chemical changes in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding strength with the positive electrode active material by having fine irregularities on its surface, and may be formed in various forms such as film, sheet, foil, mesh, net, porous body, foam, or nonwoven fabric.

The positive electrode active material may comprise a positive electrode active material and optionally an electrically conductive material, and a binder.

The positive electrode active material may be at least one selected from the group consisting of elemental sulfur ($S_8$); $Li_2S_n (n \geq 1)$, an organic sulfur compound, and a carbon-sulfur polymer (($C_2S_x)_n$: x=2.5~50, n≥2). Preferably, the inorganic sulfur (Se) can be used.

The positive electrode may further comprise at least one additive selected from a transition metal element, a group IIIA element, a group IVA element, a sulfur compound of these elements, and an alloy of these elements and sulfur, in addition to the positive electrode active material.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg or the like, and the group IIIA element may comprise Al, Ga, In, Ti or the like, and the group IVA element may comprise Ge, Sn, Pb, or the like.

The electrically conductive material is intended to improve electrical conductivity and is not particularly limited as long as it is an electrically conductive material that does not cause chemical change in the lithium secondary battery. Generally, carbon black, graphite, carbon fiber, carbon nanotube, metal powder, electrically conductive metal oxide, organic electrically-conductive material and the like can be used. Products that are currently marketed as conductive materials may comprise acetylene black series (products from Chevron Chemical Company or Gulf Oil Company), Ketjen Black EC series (products from Armak Company), Vulcan XC-72 (a product from Cabot Company) and Super P (a product from MMM). For example, acetylene black, carbon black, graphite, etc. may be used.

In addition, the positive electrode active material may further comprise a binder having a function of holding the positive electrode active material on the positive electrode current collector and connecting between active materials. As the binder, for example, various types of binders such as polyvinylidene fluoride-hexafluoropropylene (PVDF-co-HFP), polyvinylidene fluoride (PVDF), polyacrylonitrile, polymethyl methacrylate, styrene-butadiene rubber (SBR), carboxyl methyl cellulose (CMC) and the like can be used.

As the positive electrode, a positive electrode having a high sulfur loading may be used. The loading amount of sulfur may be 3.0 mAh/cm$^2$ or more, preferably 4.0 mAh/cm$^2$ or more, and more preferably 5.0 mAh/cm$^2$ or more.

The negative electrode may comprise a negative electrode current collector and a negative electrode active material positioned on the negative electrode current collector. Alternatively, the negative electrode may be a lithium metal plate.

The negative electrode current collector is for supporting the negative electrode active material, and is not particularly limited as long as it has excellent electrical conductivity and is electrochemically stable in the voltage range of a lithium secondary battery. For example, copper, stainless steel, aluminum, nickel, titanium, sintered carbon; copper or stainless steel surface-treated with carbon, nickel, titanium, silver or the like; aluminum-cadmium alloy or the like may be used as the negative electrode current collector.

The negative electrode current collector can enhance the bonding force with the negative electrode active material by having fine irregularities formed on its surface, and may be formed in various forms such as film, sheet, foil, mesh, net, porous body, foam, or nonwoven fabric.

The negative electrode active material may comprise a material capable of reversibly intercalating or de-intercalating lithium ion (Li$^+$), a material capable of reversibly forming lithium containing compounds by reacting with lithium ion, or lithium metal or lithium alloy. The material capable of reversibly intercalating or de-intercalating lithium ion (Li$^+$) can be, for example, crystalline carbon, amorphous carbon, or a mixture thereof. The material capable of reversibly reacting with lithium ion (Li$^+$) to form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn). Preferably, the negative electrode active material may be lithium metal, and specifically, may be in the form of a lithium metal thin film or lithium metal powder.

The method of forming the negative electrode active material is not particularly limited, and a method of forming a layer or film commonly used in the art may be used. For example, methods such as compression, coating, and deposition may be used. In addition, a case, in which a thin film of metallic lithium is formed on a metal plate by initial charging after assembling a battery without a lithium thin film in the current collector, is also comprised in the negative electrode of the present disclosure.

The separator is for physically separating the positive electrode and the negative electrode in the lithium-sulfur secondary battery of the present disclosure, and can be used without any particular limitation as long as it is normally used as a separator in a lithium-sulfur secondary battery. In particular, the separator is preferred as it has a low resistance to the migration of ions in the electrolyte and an excellent electrolyte solution impregnation ability.

The separator may be formed of a porous substrate, and the porous substrate may be any porous substrate conventionally used in an electrochemical device. For example, a polyolefin-based porous membrane or a nonwoven fabric may be used as the porous substrate, but it is not particularly limited thereto.

Examples of the polyolefin-based porous membrane may comprise a membrane formed of polyolefin-based polymer, such as polyethylene such as high-density polyethylene, linear low-density polyethylene, low density polyethylene and ultra-high molecular weight polyethylene, polypropylene, polybutylene, and polypentene, alone or a mixture thereof.

The nonwoven fabric may comprise, in addition to the polyolefin-based nonwoven fabric, for example, a nonwoven fabric formed of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalate alone or a mixture thereof. The structure of the nonwoven fabric may be a spun bond nonwoven fabric or a melt blown nonwoven fabric composed of long fibers.

The thickness of the porous substrate is not particularly limited, but may be 1 to 100 µm, preferably 5 to 50 µm.

The size and porosity of the pores present in the porous substrate are also not particularly limited, but may be 0.001 µm to 50 µm and 10 to 95%, respectively.

The electrolyte solution contains lithium ions, and is to cause an electrochemical oxidation or reduction reaction at the positive electrode and the negative electrode through them, and is the same as described above.

The injection of the electrolyte solution may be performed at an appropriate stage during the manufacturing process of the electrochemical device according to the manufacturing process of the final product and required physical properties. That is, it may be applied before assembling the electrochemical device or in the final stage of assembling the electrochemical device.

The lithium-sulfur secondary battery according to the present disclosure can be manufactured by lamination, stacking, and folding processes of the separator and the electrodes, in addition to the usual winding process.

The shape of the lithium-sulfur secondary battery is not particularly limited, and may be various shapes such as a cylindrical shape, a laminate shape, and a coin shape.

Hereinafter, preferred examples are presented to help the understanding of the present disclosure, but the following examples are only provided to more easily understand the present disclosure, and the present disclosure is not limited thereto.

EXAMPLE

Preparation of Electrolyte Solution for Lithium-Sulfur Secondary Battery

Example 1-1

0.75 M (mol/L) of lithium bis(trifluoromethyl sulfonyl) imide (LiTFSI) and 5 wt. % of lithium nitrate (LiNO$_3$) were dissolved in a mixed solvent obtained by mixing 75 vol. % of dimethoxyethane (DME), 20 vol. % of 2-methylfuran (2-MeF) and 5 vol. % of tris(2,2,2-trifluoroethyl)orthoformate (TFEO), relative to the total volume of the non-aqueous solvent, to prepare an electrolyte solution for a lithium-sulfur secondary battery.

Example 1-2

An electrolyte solution for a lithium-sulfur secondary battery was prepared in the same manner as in Example 1-1, except that dimethoxyethane (DME) was used in an amount of 70 vol. % and tris(2,2,2-trifluoroethyl)orthoformate (TFEO) was used in an amount of 10 vol. %.

Example 1-3

An electrolyte solution for a lithium-sulfur secondary battery was prepared in the same manner as in Example 1-1, except that dimethoxyethane (DME) was used in an amount of 60 vol. % and tris(2,2,2-trifluoroethyl)orthoformate (TFEO) was used in an amount of 20 vol. %.

Example 2-1

An electrolyte solution for a lithium-sulfur secondary battery was prepared in the same manner as in Example 1-1, except that tris(2,2-difluoroethyl)orthoformate (TDOF) was used instead of tris(2,2,2-trifluoroethyl)orthoformate (TFEO).

Example 2-2

An electrolyte solution for a lithium-sulfur secondary battery was prepared in the same manner as in Example 2-1, except that dimethoxyethane (DME) was used in an amount of 70 vol. % and tris(2,2-difluoroethyl)orthoformate (TDOF) was used in an amount of 10 vol. %.

Example 2-3

An electrolyte solution for a lithium-sulfur secondary battery was prepared in the same manner as in Example 2-1, except that dimethoxyethane (DME) was used in an amount of 60 vol. % and tris(2,2-difluoroethyl)orthoformate (TDOF) was used in an amount of 20 vol. %.

Comparative Example 1-1

An electrolyte solution for a lithium-sulfur secondary battery was prepared in the same manner as in Example 1-1, except that dimethoxyethane (DME) was used in an amount of 77 vol. % and tris(2,2,2-trifluoroethyl)orthoformate (TFEO) was used in an amount of 3 vol. %.

Comparative Example 1-2

An electrolyte solution for a lithium-sulfur secondary battery was prepared in the same manner as in Example 1-1, except that dimethoxyethane (DME) was used in an amount of 58 vol. % and tris(2,2,2-trifluoroethyl)orthoformate (TFEO) was used in an amount of 22 vol. %.

Comparative Example 1-3

An electrolyte solution for a lithium-sulfur secondary battery was prepared in the same manner as in Example 1-1, except that dimethoxyethane (DME) was used in an amount of 80 vol. %, and tris(2,2,2-trifluoroethyl)orthoformate (TFEO) was not used.

Comparative Example 1-4

An electrolyte solution for a lithium-sulfur secondary battery was prepared in the same manner as in Example 1-1, except that dimethoxyethane (DME) was used in an amount of 90 vol. %, tris(2,2,2-trifluoroethyl)orthoformate (TFEO) was used in an amount of 10 vol. %, and 2-methylfuran (2-MeF) was not used.

Comparative Example 1-5

An electrolyte solution for a lithium-sulfur secondary battery was prepared in the same manner as in Example 1-1, except that 2-methylfuran (2-MeF) was used in an amount of 90 vol. %, tris(2,2,2-trifluoroethyl)orthoformate (TFEO) was used in an amount of 10 vol. %, and dimethoxyethane (DME) was not used.

Comparative Example 2-1

An electrolyte solution for a lithium-sulfur secondary battery was prepared in the same manner as in Example 2-1, except that dimethoxyethane (DME) was used in an amount of 77 vol. % and tris(2,2-difluoroethyl)orthoformate (TDOF) was used in an amount of 3 vol. %.

Comparative Example 2-2

An electrolyte solution for a lithium-sulfur secondary battery was prepared in the same manner as in Example 2-1, except that dimethoxyethane (DME) was used in an amount of 58 vol. % and tris(2,2-difluoroethyl)orthoformate (TDOF) was used in an amount of 22 vol. %.

Comparative Example 2-3

An electrolyte solution for a lithium-sulfur secondary battery was prepared in the same manner as in Example 2-1, except that dimethoxyethane (DME) was used in an amount of 80 vol. % and tris(2,2-difluoroethyl)orthoformate (TDOF) was not used.

Comparative Example 2-4

An electrolyte solution for a lithium-sulfur secondary battery was prepared in the same manner as in Example 2-1, except that dimethoxyethane (DME) was used in an amount of 90 vol. %, tris(2,2-difluoroethyl)orthoformate (TDOF) was used in an amount of 10 vol. %, and 2-methylfuran (2-MeF) was not used.

Comparative Example 2-5

An electrolyte solution for a lithium-sulfur secondary battery was prepared in the same manner as in Example 2-1, except that 2-methylfuran (2-MeF) was used in an amount of 90 vol. %, tris(2,2-difluoroethyl)orthoformate (TDOF) was used in an amount of 10 vol. %, and dimethoxyethane (DME) was not used.

The contents of the linear ether, the cyclic ether and the compound represented by Chemical Formula 1 in the electrolyte solutions for a lithium-sulfur secondary battery prepared in Examples 1-1 to 1-3, Examples 2-1 to 2-3, Comparative Examples 1-1 to 1-5, and Comparative Examples 2-1 to 2-5 are as shown in Table 1 below:

TABLE 1

| | Composition of solvent (vol. %) | | | |
|---|---|---|---|---|
| | Linear ether | Cyclic ether | Compound represented by Chemical Formula 1 | |
| | DME* | 2-MeF** | TFEO*** | TDOF**** |
| Example 1-1 | 75 | 20 | 5 | — |
| Example 1-2 | 70 | 20 | 10 | — |
| Example 1-3 | 60 | 20 | 20 | — |
| Example 2-1 | 75 | 20 | — | 5 |
| Example 2-2 | 70 | 20 | — | 10 |
| Example 2-3 | 60 | 20 | — | 20 |
| Comparative Example 1-1 | 77 | 20 | 3 | — |
| Comparative Example 1-2 | 58 | 20 | 22 | — |
| Comparative Example 1-3 | 80 | 20 | — | — |
| Comparative Example 1-4 | 90 | — | 10 | — |
| Comparative Example 1-5 | — | 90 | 10 | — |
| Comparative Example 2-1 | 77 | 20 | — | 3 |
| Comparative Example 2-2 | 58 | 20 | — | 22 |
| Comparative Example 2-3 | 80 | 20 | — | — |
| Comparative Example 2-4 | 90 | — | — | 10 |
| Comparative Example 2-5 | — | 90 | — | 10 |

*DME: dimethoxyethane
**2-MeF: 2-methylfuran
***TFEO: tris (2,2,2-trifluoroethyl)orthoformate
****TDOF: tris (2,2-difluoroethyl)orthoformate Experimental Example Evaluation of Lifetime Characteristics of Lithium-Sulfur Secondary Battery Sulfur was mixed with an electrically conductive material and a binder in acetonitrile using a ball mill to prepare a slurry for a positive electrode active material. At this time, carbon black was used as the electrically conductive material, and a binder of a mixed type of SBR and CMC was used as the binder, and the mixing ratio was such that sulfur: electrically conductive material:binder was 72:24:4 by weight. The slurry for the positive electrode active material was applied to an aluminum current collector such that the loading amount was 5.0 mAh/cm$^2$, and then dried to prepare a positive electrode having a porosity of 68%. In addition, lithium metal having a thickness of 45 μm was used as a negative electrode.

The positive electrode and the negative electrode prepared by the above method were positioned to face each other, and then a polyethylene separator having a thickness of 20 μm and a porosity of 45% was interposed between the positive electrode and the negative electrode.

Thereafter, electrolyte solutions according to Examples 1-1 to 1-3, Examples 2-1 to 2-3, Comparative Examples 1-1 to 1-5 and Comparative Examples 2-1 to 2-5 are injected into the case to manufacture a lithium-sulfur secondary battery.

Discharging and charging of the lithium-sulfur secondary battery prepared by the above method were repeated 2.5 times at a current density of 0.1 C, and then discharging and charging were repeated 3 times at a current density of 0.2 C. Thereafter, while carrying out 300 cycles at a current density of 0.5 C, the lifetime characteristics of the battery were confirmed by measuring the lifetime cycle when the capacity retention rate of the lithium-sulfur secondary battery was 80%. The results obtained at this time are shown in Table 2.

TABLE 2

| | Lifetime cycle (80% capacity retention rate) |
|---|---|
| Example 1-1 | 228 |
| Example 1-2 | 235 |
| Example 1-3 | 219 |
| Example 2-1 | 258 |
| Example 2-2 | 284 |
| Example 2-3 | 235 |
| Comparative Example 1-1 | 198 |
| Comparative Example 1-2 | 177 |
| Comparative Example 1-3 | 194 |
| Comparative Example 1-4 | 132 |
| Comparative Example 1-5 | — |
| Comparative Example 2-1 | 201 |
| Comparative Example 2-2 | 189 |
| Comparative Example 2-3 | 194 |
| Comparative Example 2-4 | 158 |
| Comparative Example 2-5 | — |

However, the electrolyte solutions according to Comparative Examples 1-5 and 2-5, which do not contain the linear ether, cannot sufficiently dissolve lithium bis(trifluoromethyl sulfonyl)imide (LiTFSI) and lithium nitrate (LiNO$_3$), and thus it was difficult to operate the battery, so the lifetime characteristics could not be measured.

As shown in Table 2 above, in the case of lithium-sulfur secondary batteries to which electrolyte solutions according to Examples 1-1 to 1-3 and Examples 2-1 to 2-3 are applied, it was confirmed that the lifetime characteristics of the battery were excellent compared to the lithium-sulfur secondary batteries to which the electrolyte solutions according to Comparative Examples 1-1 to 1-2 and Comparative Examples 2-1 to 2-2 were applied.

Specifically, the lithium-sulfur secondary batteries according to the present disclosure use the electrolyte solutions for the lithium-sulfur secondary battery according to Examples 1-1 to 1-3 and Examples 2-1 to 2-3 which have 5 vol. % to 20 vol. % of the content of the compound represented by Chemical Formula 1 (tris(2,2,2-trifluoroethyl)orthoformate) or the trialkyl orthoformate compound (tris(2,2-difluoroethyl)orthoformate) in the non-aqueous solvent, and thus a stable SEI (Solid-Electrolyte Interphase) film is formed on the lithium negative electrode to suppress the reaction between lithium and polysulfide and decomposition of the electrolyte solution, thereby exhibiting the effect of improving the lifetime characteristics of the battery.

Also, it was confirmed that in the case of the lithium-sulfur secondary batteries to which electrolyte solutions according to Examples 1-1 to 1-3 and Examples 2-1 to 2-3 are applied, the lifetime characteristics of the batteries were excellent compared to the lithium-sulfur secondary batteries to which the electrolyte solutions according to Comparative Examples 1-3 to 1-5 and Comparative Examples 2-3 to 2-5 were applied.

Specifically, it was confirmed that the lithium-sulfur secondary batteries according to the present disclosure use the electrolyte solutions for the lithium-sulfur secondary battery according to Examples 1-1 to 1-3 and Examples 2-1 to 2-3 which comprise all linear ether, the cyclic ether, and the compound represented by Chemical Formula 1 as a non-aqueous solvent, and thus have excellent battery lifetime characteristics, compared to comparative Example 1-3 and Comparative Example 2-3 which do not comprise the compound represented by Chemical Formula 1, Comparative Example 1-4 and Comparative Example 2-4 which do not comprise the cyclic ether, and Comparative Examples 1-5 and Comparative Examples 2-5 which do not comprise the linear ether.

All simple modifications and variations of the present disclosure fall within the scope of the present disclosure, and the specific scope of protection of the present disclosure will become apparent from the appended claims.

The invention claimed is:

1. An electrolyte solution for a lithium-sulfur secondary battery, comprising:
   a lithium salt; and
   a non-aqueous solvent,
   wherein the non-aqueous solvent comprises an ether-based solvent and a nonsolvent,
   wherein the ether-based solvent comprises a linear ether and a cyclic ether,
   wherein the nonsolvent comprises a compound represented by Chemical Formula 1,
   wherein the content of the nonsolvent is 5 vol. % to 10 vol. % relative to the total volume of the non-aqueous solvent:

[Chemical Formula 1]

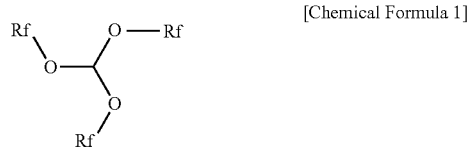

wherein Rfs are the same as or different from each other, and each Rf independently represents a fluorinated $C_1$ to $C_3$ alkyl group.

2. The electrolyte solution for the lithium-sulfur secondary battery according to claim 1, wherein the lithium salt is at least one selected from the group consisting of LiCl, LiBr, LiI, LiClO$_4$, LiBF$_4$, LiB$_{10}$Cl$_{10}$, LiB(Ph)$_4$, LiCABO$_8$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$FsSO$_2$)$_2$, LiN(SO$_2$F)$_2$, lithium chloroborane, lithium lower aliphatic carboxylate, lithium tetraphenyl borate, and lithium imide.

3. The electrolyte solution for the lithium-sulfur secondary battery according to claim 1, wherein the linear ether is selected from the group consisting of dimethyl ether, diethyl ether, dipropyl ether, dibutyl ether, diisobutyl ether, ethylmethyl ether, ethylpropyl ether, ethyl tertbutyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethyl ether, butylene glycol ether, diethylene glycol ethyl methyl ether, diethylene glycol isopropyl methyl ether, diethylene glycol butyl methyl ether, diethylene glycol ter-tbutyl ethyl ether, and ethylene glycol ethyl methyl ether.

4. The electrolyte solution for the lithium-sulfur secondary battery according to claim 1, wherein the cyclic ether is selected from the group consisting of dioxolane, methyldioxolane, dimethyldioxolane, vinyldioxolane, methoxydioxolane, ethylmethyldioxolane, oxane, dioxane, trioxane, tetrahydrofuran, methyltetrahydrofuran, dimethyltetrahydrofuran, dimethoxytetrahydrofuran, ethoxytetrahydrofuran, dihydropyran, tetrahydropyran, furan, and 2-methylfuran.

5. The electrolyte solution for the lithium-sulfur secondary battery according to claim 1, wherein the fluorinated C1 to C3 alkyl group is a fluorinated C1 to C3 alkyl group substituted with 1 to 7 fluorines.

6. The electrolyte solution for the lithium-sulfur secondary battery according to claim 1, wherein the fluorinated C1 to C3 alkyl group is a fluorinated C1 to C2 alkyl group substituted with 1 to 5 fluorines.

7. The electrolyte solution for the lithium-sulfur secondary battery according to claim 1, wherein the fluorinated C1 to C3 alkyl group contains a difluoromethyl group or a trifluoromethyl group bonded to its terminal.

8. The electrolyte solution for the lithium-sulfur secondary battery according to claim 1, wherein the content of the linear ether is 50 vol. % to 90 vol. % relative to the total volume of the non-aqueous solvent, and the content of the cyclic ether is 10 vol. % to 30 vol. % relative to the total volume of the non-aqueous solvent.

9. The electrolyte solution for the lithium-sulfur secondary battery according to claim 1, wherein a volume ratio of the ether-based solvent to the nonsolvent is 95:5 to 80:20.

10. The electrolyte solution for the lithium-sulfur secondary battery according to claim 1, wherein a volume ratio of the linear ether to the cyclic ether is 9:1 to 5:5.

11. The electrolyte solution for the lithium-sulfur secondary battery according to claim 1, wherein the linear ether is dimethoxyethane.

12. The electrolyte solution for the lithium-sulfur secondary battery according to claim 1, wherein the cyclic ether is 2-methylfuran.

13. The electrolyte solution for the lithium-sulfur secondary battery according to claim 1, wherein the compound represented by Chemical Formula 1 is tris (2,2-difluoroethyl) orthoformate or tris (2,2,2-trifluoroethyl) orthoformate.

14. A lithium-sulfur secondary battery, comprising:
   the electrolyte solution of claim 1;
   a positive electrode;
   a negative electrode; and
   a separator.

* * * * *